No. 853,916. PATENTED MAY 14, 1907.
A. CAMPBELL.
COTTON HARVESTER.
APPLICATION FILED JUNE 26, 1906.
5 SHEETS—SHEET 2.
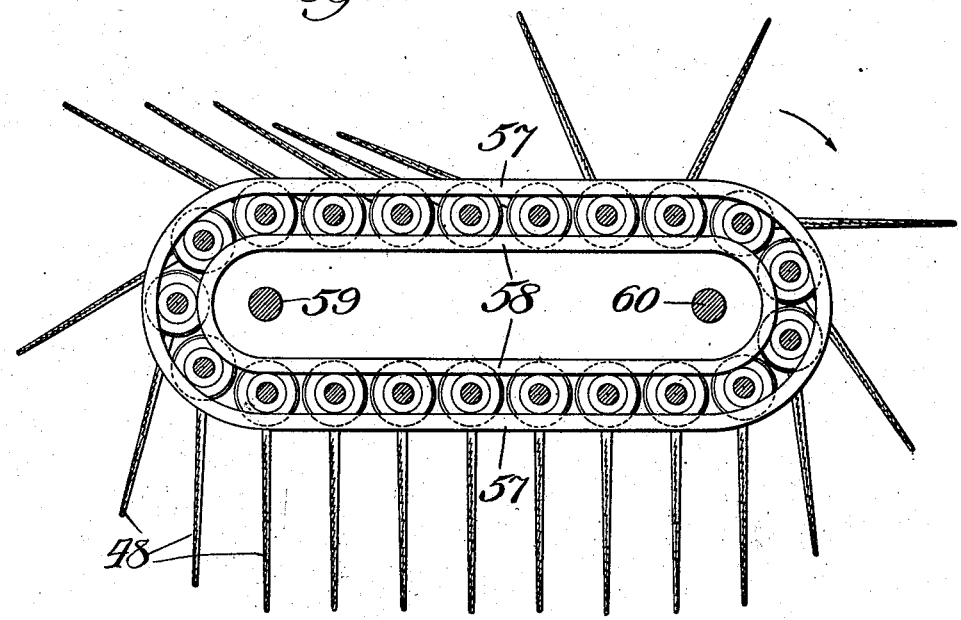
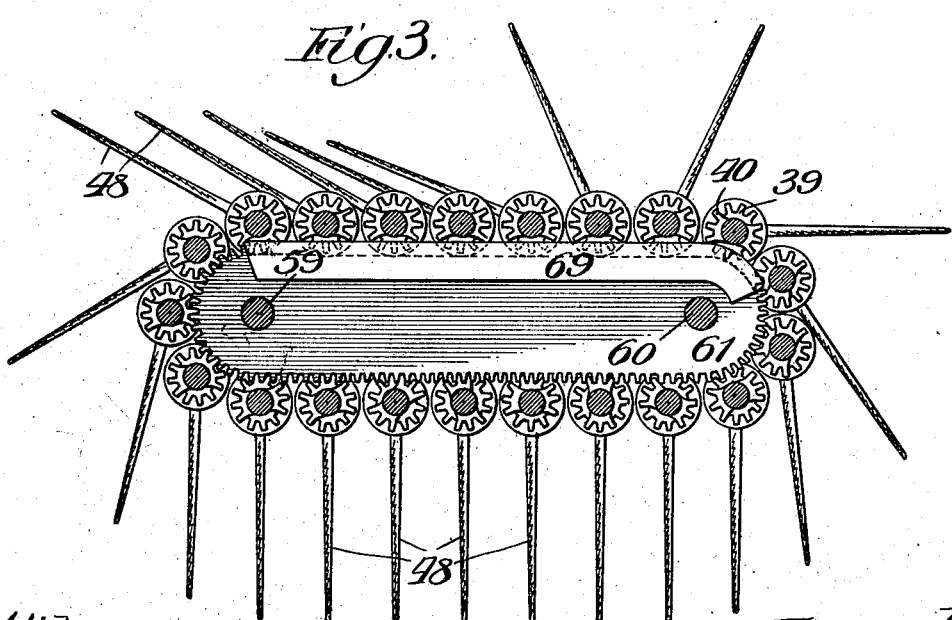

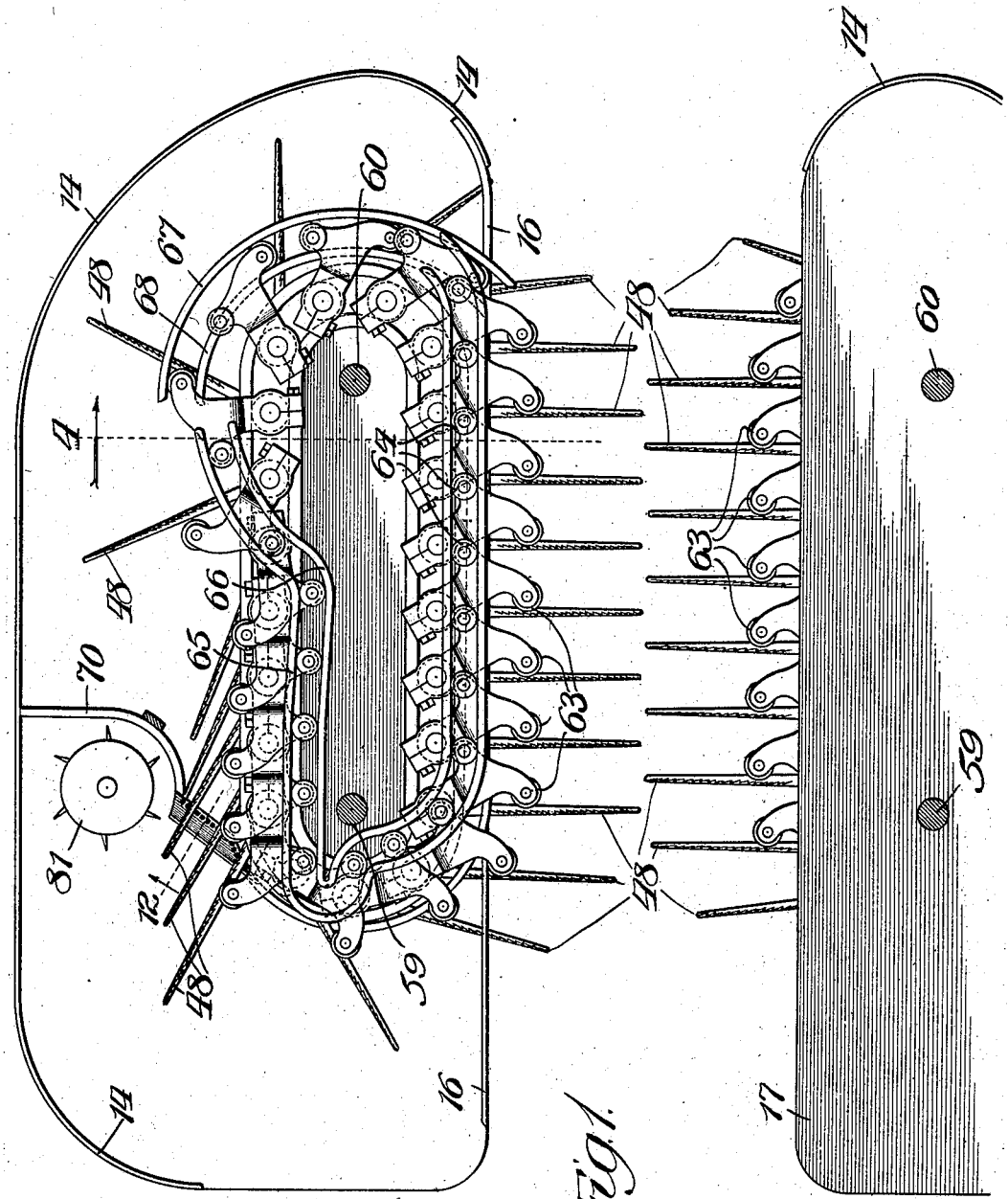

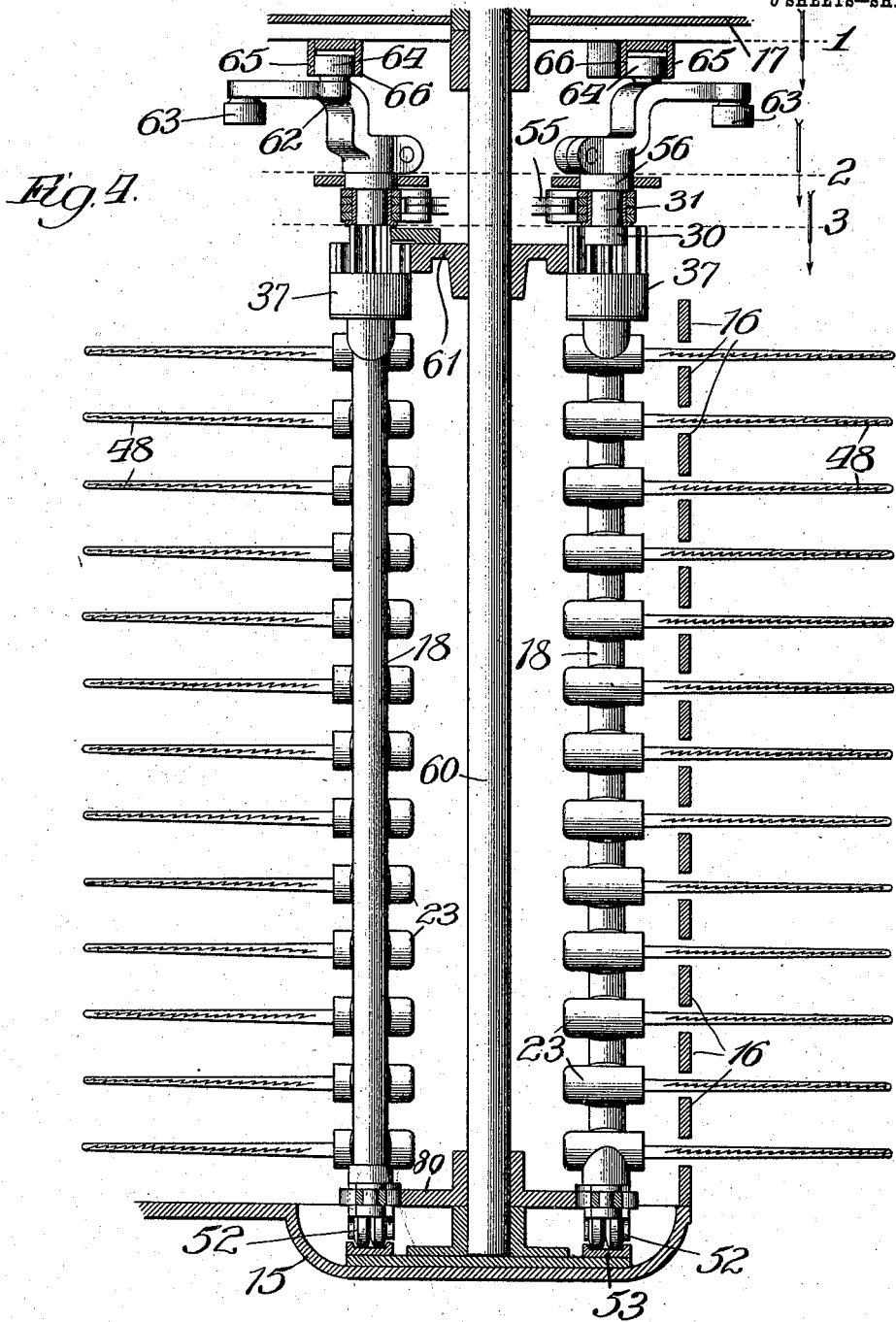

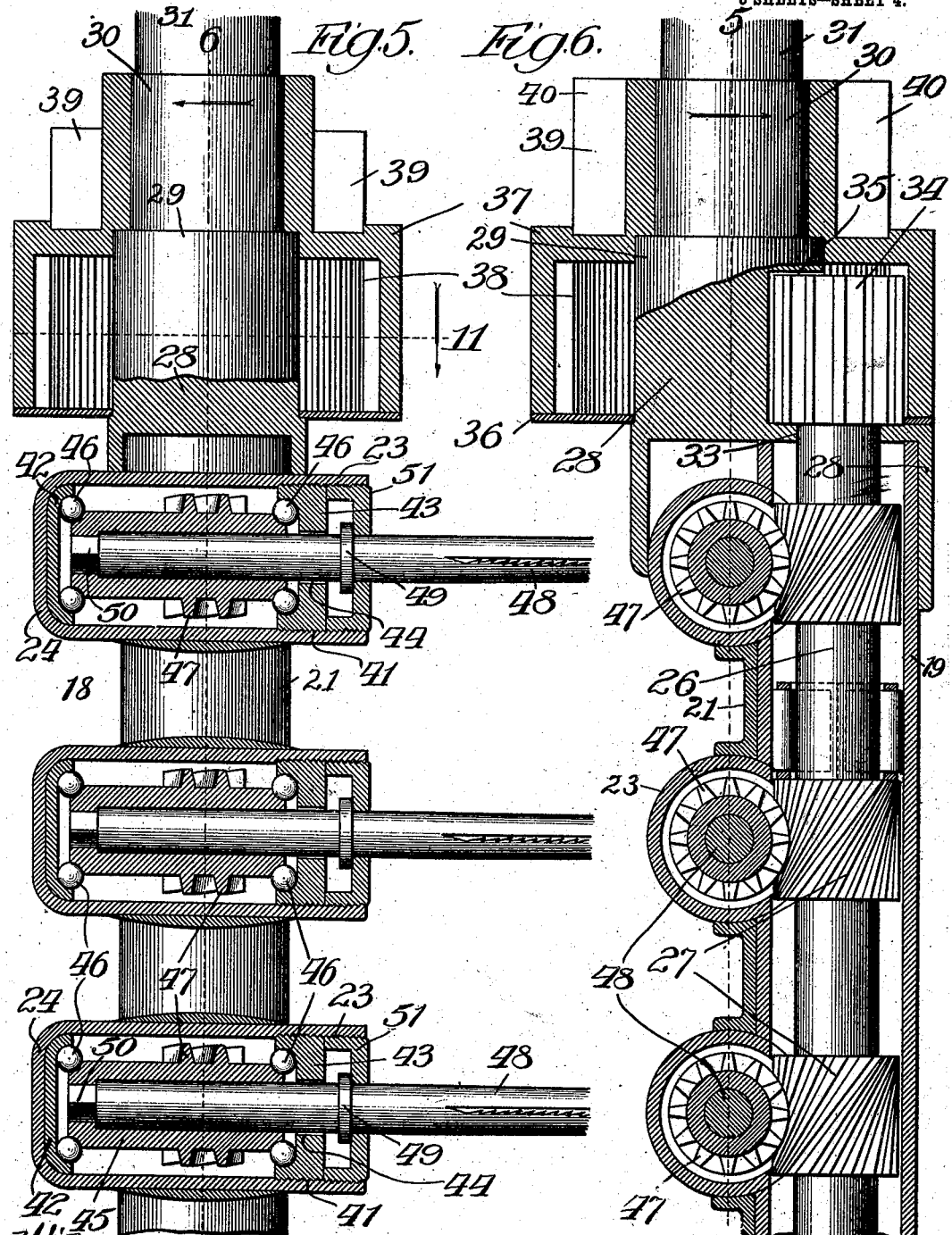

No. 853,916. PATENTED MAY 14, 1907.
A. CAMPBELL.
COTTON HARVESTER.
APPLICATION FILED JUNE 26, 1906.
5 SHEETS—SHEET 5.
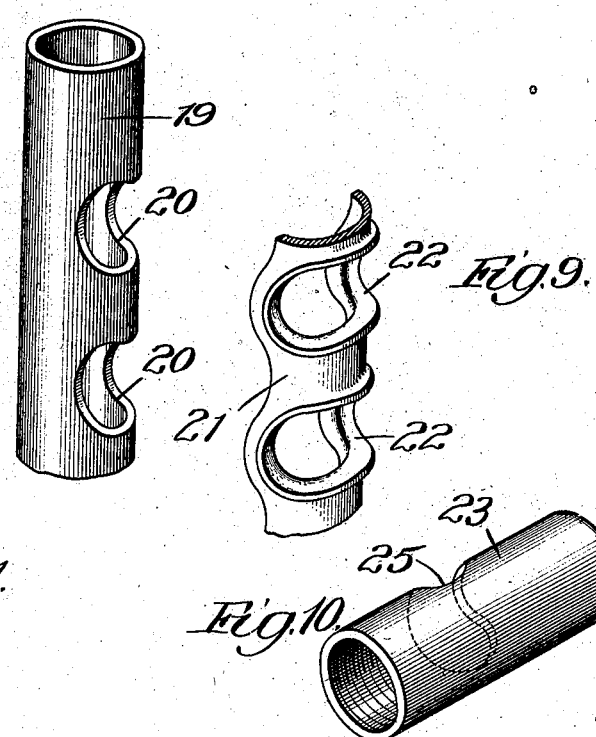
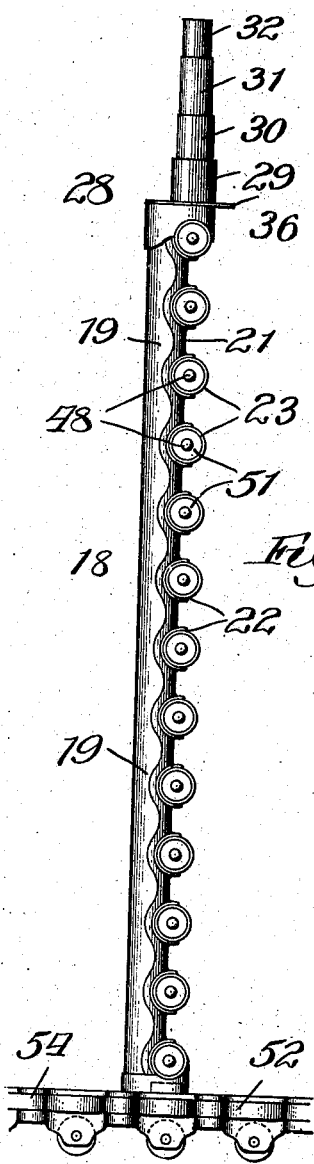
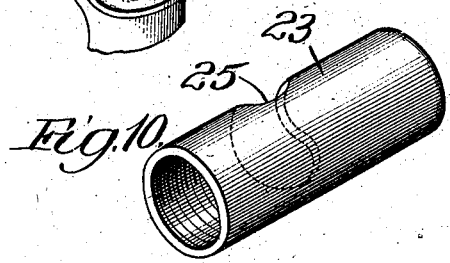
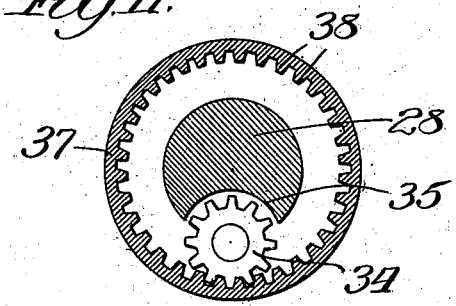
Witnesses:
Inventor:
Angus Campbell,
By Dyrenforth, Dyrenforth, Lee & Wiles,
Attys

UNITED STATES PATENT OFFICE.

ANGUS CAMPBELL, OF PITTSBURG, PENNSYLVANIA.

COTTON-HARVESTER.

No. 853,916.  Specification of Letters Patent.  Patented May 14, 1907.

Application filed June 26, 1906. Serial No. 323,485.

*To all whom it may concern:*

Be it known that I, ANGUS CAMPBELL, a citizen of the United States, residing at Pittsburg, in the county of Allegheny and State of Pennsylvania, have invented a new and useful Improvement in Cotton-Harvesters, of which the following is a specification.

My invention relates to improvement in the construction of cotton-harvesters of the type in which opposed co-operating series of axially rotating picker-spindles are mounted upon vertical, axially rocking carriers and moved along the adjacent inner sides of the machine at the speed of the forward travel of the machine. The rocking carriers are operated to thrust the picker spindles longitudinally, into the plants, at the forward end of their backward course and withdraw the picker spindles longitudinally, from the plants, as they reach the rear end of their backward course. A cotton harvester of this type was first shown and described by me in Letters Patent No. 542794; granted July 16, 1895. Improvements upon the construction of the original machine are shown, for example, in Letters Patent Nos. 685439 to 685443, inclusive, granted to me October 29, 1901, No. 722421 granted to me March 10, 1903 and No. 777595 granted to me December 13, 1904.

My present invention relates more particularly to improvement in the construction of the carrier tubes, and means for rocking them on their axes; my object being to make the cotton-picking mechanism more compact and much lighter, than hitherto, and much more easy running, and to obviate the necessity of causing the opposing picker-spindles to intermesh with each other in the plants.

The general appearance and mode of operation of the machine are very similar to my former machines, and in the accompanying drawings I have thought it unnecessary to illustrate more than is required to convey a clear understanding of my present features of improvement.

Referring to the drawings—Figure 1 is a broken plan view illustrating companion drums, or casings, containing the co-operating picker, stripper and cleaner mechanisms, the cover portion of the upper drum in the figure being removed on line 1 in Fig. 4 to expose features which would otherwise be hidden; Figs. 2 and 3, reduced plan sections taken, respectively, on lines 2 and 3 in Fig. 4, with the casing portion left out to avoid confusion; Fig. 4, a broken and enlarged transverse section taken on line 4 in Fig. 1 and viewed in the direction of the arrow; Fig. 5, a broken vertical section through the upper portion of one of the carriers, the section being taken on line 5 in Fig. 6; Fig. 6, a sectional view of the same parts taken on line 6 in Fig. 5; Fig. 7, a view showing one of the carriers in elevation and a few of an endless chain of casters on which the carriers travel; Figs. 8 and 9, enlarged broken perspective views of details of the casing portions of the carriers; Fig. 10, an enlarged perspective view of one of the spindle-bearing cups, and Fig. 11, a plan section on a reduced scale taken on line 11 in Fig. 5.

14, 14 are companion drums, or casings, containing the picker mechanisms. The casings are formed as indicated in Fig. 1, and with the base portions 15, slatted inner sides 16 and top plates 17, illustrated in Fig. 4. The casings of the carriers 18 are each formed with a comparatively thin tube 19 (Fig. 8) of steel or other suitable metal, and provided with a series of openings 20 equidistant apart throughout its length. Fastened against the tube, preferably by brazing, is a facing strip 21, which may be of comparatively thin stamped metal with flanged openings 22 corresponding in size, and registering with the openings 20.

23, 23 are spindle bearing cups comprising short tubes of comparatively thin metal having closed ends 24 and openings 25 corresponding in size and shape with the openings 20, 22. The cups 23 are fastened to the flanges of the openings 22, preferably by brazing, to extend horizontally and tangentially with relation to the tubes 19. In each tube 19 is a spindle-driving shaft 26 provided at each of the openings 20 with a spiral gear 27. Brazed upon the upper end of each carrier tube 19 is a head 28 from which rises an integral stem formed with the stepped annular surfaces 29, 30, 31 and 32. In the head, concentric with the tube 19, is a bearing 33 for the upper end portion of the shaft 26, and above the said bearing the shaft carries a pinion 34. The stem portion of the head 28 has a recess 35 in its side to clear the pinion 34, as indicated most plainly in Figs. 6 and 11. In the lower end of the tube 19 is a suitable journal-bearing (not shown) for the lower end of the shaft 26. Resting upon the head 28 around the spindle portion is a bearing disk 36.

37 is a gear piece having a lower cup-shaped portion formed with an internal gear 38 surmounted by an external gear 39, in turn surmounted by a mutilated gear 40, all cast or formed preferably in one piece. This gear piece has a central bearing opening surrounding the part 30 of the spindle, which opening is enlarged at its lower end portion to fit over the shoulder at the upper end of the part 29 of the spindle, as indicated in Figs. 5 and 6. The gear piece at its annular lower end contacts with and rotates against the disk 36, and the internal gear 38 meshes in driving engagement with the pinion 34.

Each spindle-bearing cup 23 has an internal thread 41 along its open-end portion. In the base of each cup is a cupped disk 42 forming a ball-race member, and screwed upon the thread 41 is an externally-threaded nut 43 having a central opening 44 and a cup-shaped inner face forming a ball-race member. In each cup 23 is a spindle socket-piece, or holder, 45 of tubular form and provided at opposite ends with concave edges forming ball-race members. The parts are assembled as shown in Fig. 5, balls 46 being placed in the ball-races in the manner shown and the parts suitably held in place by the nuts 43. The spindle socket pieces 45 are formed between their ends with spiral gears 47 meshing in driven relation with the spiral gears 27. The spindles 48 shown are in the main construced as described and claimed in Letters Patent No. 685439, granted to me October 29, 1901, but may be somewhat shorter than hitherto, and each formed with an integral collar 49 and a squared end 50. To fasten a spindle in place it is passed at its shaft portion through the opening 44 of the nut 43 and into the socket presented by the socket piece 45, the squared end 50 of the shank passing into a squared opening in the end of the socket piece, as indicated.

If desired, the squared end portion of the picker-spindle shank may be dispensed with and the spindle held, to rotate with the socket piece 45, by friction. The inserted spindle is held against removal by means of a housing nut, or screw cap, 51, which is of the externally threaded cup-shape indicated to overlap at a central opening the collar 49 of the spindle.

The carriers 18 are mounted at their lower ends upon an endless chain of casters 52, which travel upon an endless oblong track 53 mounted upon the base 15 of the drum, or casing, 14. The links 54 which connect the casters pivotally together form therewith, in effect, an endless driving chain. The links of the endless chain 55 receive and engage the spindle portions of the carriers at the surfaces 31 thereof, and on the surfaces 32 of the stems are journaled rollers 56 which move in an endless guide formed by the bars 57, 58, shown most plainly in Fig. 2. The construction described is very similar to that shown in my aforesaid former patents, though it is new to provide the rollers 56 and endless, oblong, straight sided guide slot formed by the inner and outer bars, or the like, 57, 58, which operate to steady and guide the upper end portions of the carriers. The vertical drive-shafts 59, 60 carry sprocket-wheels 80 near their lower ends for driving the chain of casters, and similar sprocket-wheels (not shown) near their upper ends engaging and driving the chain 55. The shafts 59 and 60, as shown and described in my former patents, are geared with relation to the running gear of the harvester to travel at the inner sides of the drums in the backward direction at a speed approximating the forward movement of the machine. The pinions 39 with the mutilated gears 40, during the movement of the carriers around the end portions of the guide tracks 57, 58 and along the inner courses in the backward direction, engage the teeth of a stationary rack-plate 61 whereby the gear-pieces 37 are rotated to rotate the shafts 26 and all the spindles geared in driven relation thereto. The carriers and spindles thereon move in the direction indicated by the arrow in Fig. 2. As they move around the forward end of their course (the right-hand end in Figs. 1, 2 and 3) the spindles are thrust longitudinally into the cotton plants, in a manner to prevent their slapping against parts of the plants which would tend to break twigs and knock off green bolls. The means for rocking the carriers on their axes to properly guide the spindles is in the main the same as shown and described in my former patents aforesaid. Clamped, or otherwise secured to the upper end portion 32 of each carrier-stem is a bent arm 62 carrying at its end a downward projecting anti-friction roller 63 and between its ends upward projecting anti-friction rollers 64. The bars 65, 66, bent, as, and mounted in the position, shown, form guide-tracks entered by the rollers 64 as the carriers commence to move along their backward course and disengaged by the rollers 64 as the carriers near the end of their forward course. The rollers 63 during the movement of the carriers around the forward end of their course, enter and travel in a guide formed by the curved bars 67, 68, shown in Fig. 1. The axial rocking of the carriers produced by the engagement of the rollers 64, 63 with the guides mentioned, has the effect of thrusting the picker spindles longitudinally into the plants as stated when the carriers start to move in the backward direction, maintain the picker-spindles extended during the movement of the carriers in the backward direction, withdraw the picker-spindles longitudinally from the plants when the carriers reach the end of their backward movement, then turn the carriers to cause the spindles to be drawn longitudinally for a certain distance in the movement of the carriers in the forward direction, then rock the carriers to turn the spindles to extend in the forward direction and thereafter, as the carriers move around the forward end, thrust the spindles longitudinally into the plants.

In their initial movement longitudinally in the forward direction after being withdrawn from the plants the picker-spindles are drawn between stripper-strips, as usual, to remove the gathered cotton therefrom. It is necessary during this operation that the picker-spindles shall be held against axial rotation to more than a very slight extent, and this axial rotation is prevented by the sliding of the mutilated gears 40 at one straight side along the edge of the guide-bar 69 mounted, as hitherto, upon the rack-plate 61. As a pinion 39 disengages the teeth of the rack-plate 61 one side of the attendant mutilated gear moves against and slides along the edge of the guide-bar 69, which prevents further rotation of the respective shaft 26. When the end of the guide-bar 69 is reached the pinions 39 engage the teeth of the rack-plate and rotation of the respective shaft 26 is resumed.

The mechanism for stripping cotton from the picker-spindles consists of parallel horizontal slats 70 which may be shaped as shown in Fig. 1, conforming in position to the slats 16, with elongated openings between them, the slats 70 being provided with any suitable means, such as bunches of wire or stripper-edges, or both (not shown), for engaging the spindles to strip them of the cotton carried thereby, the cotton during this stripping operation being moved toward a spike roller 81, described in my former patents, which operates with the strippers to remove all the cotton from the spindles.

By constructing the carriers as described, they may be of a minimum diameter consistent with strength, and thus not only materially lighten the construction but also permit the spindles to be placed closer together than hitherto. Formerly it was necessary that, to cause proper engagement of the spindles with cotton in open bolls of the plants, the opposing sets of spindles should intermesh in the plants.

In the present construction the spindles may be so close together that it is unnecessary to provide for intermeshing and they may extend at their ends more or less close to, but short of, an intermediate plane, as illustrated in Fig. 1. It has always been a matter of some difficulty to maintain intermeshing picker-spindles in exact, properly spaced relation, owing to the fine adjustment necessary and changes effected by wear of driving parts. In my present construction this difficulty is entirely overcome.

Another great advantage of my present construction is that shorter picker-spindles may be employed than hitherto as a safeguard against bending or breaking when thrust against the stems of cotton plants.

The provision of ball-bearings for the spindles lends well known advantages, and the construction shown and described renders these bearings completely dust-proof. The construction of the gear pieces 37 with the disks 36 houses the driving gears at the tops of the picker-spindle shafts against access of dust, so that each carrier is practically dust-proof, which contributes to the easy running of the spindles and the reduction of power necessary for their operation. The carriers built up as described require no bolts or pins in their construction, and besides being very light are sufficiently strong and durable for their purpose. The worm-gears between the carrier-shafts and picker-spindles, are constructed to produce the desired number of turns in the plants in each operation, and they form a very compact arrangement. Owing to the ball-bearings the spindles turn very easily and there is practically no wear upon the worm-gears.

What I claim as new, and desire to secure by Letters Patent, is—

1. In a cotton-harvester, the combination with a series of traveling, rotary, cotton-gathering picker-spindles, of a carrier therefor comprising an upright tube having a longitudinal series of openings in one side and a tangential spindle-bearing cup at each of said openings, and spindle-rotating means in the tube.

2. In a cotton-harvester, the combination with a series of traveling, rotary, cotton-gathering picker-spindles, of a carrier therefor comprising an upright tube having a longitudinal series of openings in one side and a tangential spindle-bearing cup at each of said openings, a rotary spindle-holder journaled in each cup, and rotating means for the holders in the tube.

3. In a cotton-harvester, the combination with a series of traveling, rotary, cotton-gathering picker-spindles, of a carrier therefor comprising an upright tube having a longitudinal series of openings in one side and a tangential spindle-bearing cup at each of said openings, a rotary spindle-holder journaled on ball-bearings in each cup, and rotating means for the holders in the tube.

4. In a cotton-harvester, the combination with a series of traveling, rotary, cotton-gathering picker-spindles, of a carrier therefor comprising an upright tube having a longitudinal series of openings in one side, a tangential spindle-bearing cup at each of said openings, a spindle-driving shaft journaled in the tube provided with driving worm-gears adjacent to said openings, and a rotary spindle-holder in each of said bearing cups having a driven worm-gear meshing with the adjacent driving worm-gear.

5. In a cotton-harvester, a traveling picker-spindle carrier formed with a tube having a longitudinal series of openings in one side, a facing strip with openings registering with the tube openings, and spindle-bearing cups secured to the facing strips at the openings therein.

6. In a cotton-harvester, a traveling picker-spindle carrier formed with a tube having a longitudinal series of openings in one side, a facing strip having openings registering with the tube openings, and a spindle-bearing cup covering each of said facing-strip openings, the parts being brazed together.

7. In a cotton-harvester, a traveling picker-spindle carrier formed with a tube having a longitudinal series of openings in one side, tangential spindle-bearing cups secured against said openings, a spindle-holder journaled in each cup, and a dust-excluding cap on each cup having an opening through it for the passage of a spindle.

8. In a cotton-harvester, a traveling picker-spindle carrier formed with a tube having spindle-bearings, a spindle-driving shaft journaled in the tube and provided at its upper end with a pinion, an internally-toothed gear extending laterally beyond said tube and meshing with said pinion and surrounding it at its top and sides, and a plate fitting over the bottom side of said gear, for the purpose set forth.

9. In a cotton-harvester, a picker-spindle carrier formed with a tube having a longitudinal series of openings in one side, spindle-bearing cups secured to the tube at said openings, a spindle-driving shaft journaled in the tube, a pinion on the end of said shaft, an internally toothed gear surrounding and meshing with said pinion, a disk on the end of the tube against which said gear rotates and forming therewith, a dust-proof housing for the pinion, and means for rotating said gear during the travel of the carrier.

10. In a cotton-harvester, the combination with a series of traveling picker-spindle carriers and means for moving them, of a guide for the upper-end portions of the carriers comprising a pair of inner and outer bars forming between them an endless, oblong, straight-sided guide-slot through which the carrier projects for guidance in its travel therein.

11. In a cotton-harvester, the combination with a series of traveling picker-spindle carriers, of stems on the upper ends of the carriers, anti-friction rollers on the stems, a carrier guide comprising a pair of inner and outer bars forming between them an endless, oblong, straight-sided guide-slot in which the said rollers travel, and means for moving the carriers.

ANGUS CAMPBELL.

In presence of—
THOS. B. MORRIS,
MINNIE E. THOMAS.